(12) United States Patent
Roffman et al.

(10) Patent No.: US 6,511,178 B1
(45) Date of Patent: Jan. 28, 2003

(54) MULTIFOCAL OPHTHALMIC LENSES AND PROCESSES FOR THEIR PRODUCTION

(75) Inventors: Jeffrey H. Roffman, Jacksonville, FL (US); Denwood F. Ross, Jacksonville, FL (US); Michel Guillon, London (GB)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/356,950

(22) Filed: Jul. 19, 1999

(51) Int. Cl.⁷ .................................................. G02C 7/04
(52) U.S. Cl. ...................................................... 351/161
(58) Field of Search .............................. 351/228, 219, 351/160 R, 161, 160 H, 168, 169, 176, 177; 359/565, 570, 571

(56) References Cited

U.S. PATENT DOCUMENTS

| | | |
|---|---|---|
| 4,580,882 A | 4/1986 | Nuchman et al. |
| 4,890,913 A | 1/1990 | De Carle |
| 4,898,461 A | 2/1990 | Portney |
| 5,002,382 A | 3/1991 | Seidner |
| 5,024,517 A | 6/1991 | Seidner |
| 5,448,312 A | 9/1995 | Roffman et al. |
| 5,485,228 A | 1/1996 | Roffman et al. |
| 5,493,350 A * | 2/1996 | Seidner ..................... 351/161 |
| 5,574,518 A | 11/1996 | Mercure |
| 5,835,192 A | 11/1998 | Roffman et al. |
| 5,877,839 A | 3/1999 | Portney |
| 6,116,735 A | 9/2000 | Wada |

FOREIGN PATENT DOCUMENTS

| | | |
|---|---|---|
| EP | 0 766 951 | 4/1997 |
| WO | WO 95/26518 | 10/1995 |
| WO | WO 96/08745 | 3/1996 |
| WO | WO 96/21878 | 7/1996 |
| WO | WO 00/08516 | 2/2000 |

* cited by examiner

Primary Examiner—George Manuel
(74) Attorney, Agent, or Firm—Lois Gianneschi

(57) ABSTRACT

The invention provides lenses that have zones of more than one optical power, or focal length, and a smooth transition between the zones of differing power.

14 Claims, 1 Drawing Sheet

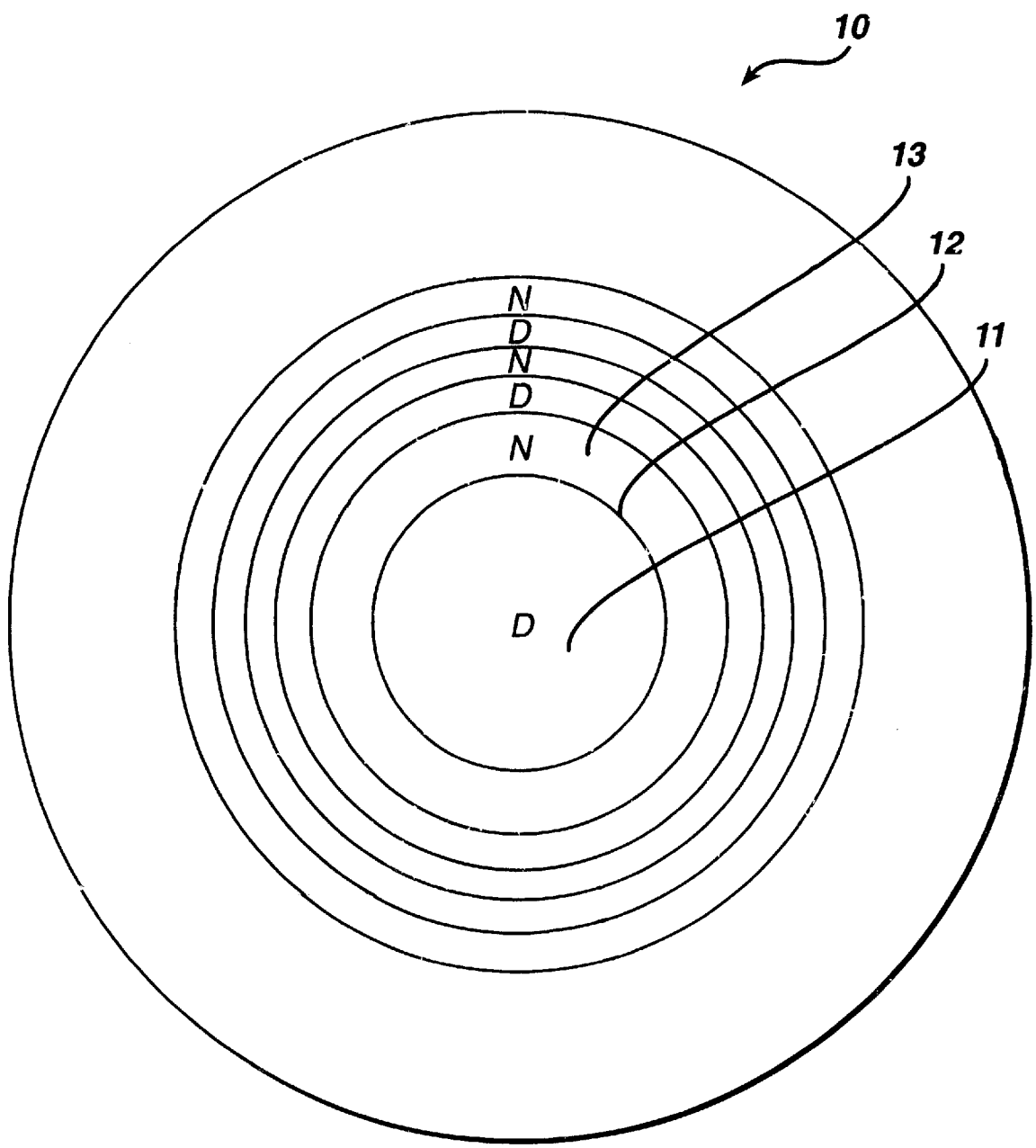

MULTIFOCAL OPHTHALMIC LENSES AND PROCESSES FOR THEIR PRODUCTION

FIELD OF THE INVENTION

The invention relates to multifocal ophthalmic lenses. In particular, the invention provides lenses that have more than one optical power, or focal length, and a smooth transition between the zones of differing power.

BACKGROUND OF THE INVENTION

As an individual ages, the eye is less able to accommodate, or bend the natural lens, to focus on objects that are relatively near to the observer. This condition is known as presbyopia. Similarly, for persons who have had their natural lens removed and an intraocular lens inserted as a replacement, the ability to accommodate is totally absent.

Among the methods used to correct for the eye's failure to accommodate are lenses that have more than one optical power. In particular, contact and intraocular lenses have been developed in which zones of distance, near, and intermediate power are provided. These lenses are disadvantageous because they are difficult to manufacture. Additionally, the lenses do not provide a smooth transition between the zones of differing refractive power.

Attempts to provide a smooth transition between zones of differing power have been made. For example, U.S. Pat. Nos. 4,898,461 and 5,877,839 disclose the use of multiple power zones, the power of each zone varying within the zone. However, the disclosed lens is difficult to manufacture and does not provide sufficient area for any one refractive power to be effective. Therefore, a need still exists for a multifocal lens that provides a smooth transition between varying power zones.

BRIEF DESCRIPTION OF THE DRAWING

FIG. 1 is a plan view of one embodiment of the lens of the invention.

DETAILED DESCRIPTION OF THE INVENTION AND PREFERRED EMBODIMENTS

The invention provides multifocal lenses, and methods for producing the lenses, in which a smooth power transition is achieved between zones of differing power. The lenses of the invention also are advantageous in that the lenses are more easily manufactured than conventional lenses.

In one embodiment, the invention provides a lens comprising, consisting essentially of, and consisting of at least two concentric, annular zones of alternating refractive power, each annular zone of a width and a radius of curvature suitable for forming a junction therebetween comprising, consisting essentially of, and consisting of a multifocal power transition zone.

By "lens" is meant a contact, an intraocular lens, a corneal implant lens, an onlay lens, and the like, or combinations thereof Preferably, the lenses of the invention are contact lenses. By "multifocal power transition zone" is meant a zone of continuously increasing or decreasing refractive power.

It is an unexpected discovery of the invention that, in a lens with concentric, annular zones of alternating refractive power, a smooth power transition between the zones may be provided by the selection of certain widths and curvatures for the annular zones. It is another unexpected discovery of the invention that the effect of the transition power zone may be augmented by selection of certain materials to form the lens, the selection of the number of annular zones used, and combinations thereof The invention simplifies the production of multifocal lenses by eliminating the need for the formation of a discrete zone of power intermediate that of the alternating power zones.

In the lenses of the invention, at least two, concentric annular zones are provided. In the case of a contact lens, the annular zones will be within the lens' optic zone. One of the annular zones is of a refractive power substantially equal to the distance optical power, or power required to correct the lens wearer's distance vision acuity. The distance optical power zone alternates with a zone of refractive power substantially equal to that of the near optical power, or power required to correct the lens wearer's near vision acuity.

It is an unexpected discovery of the invention that, in lenses containing such annular zones, by selecting certain widths and radii of curvature for the annular zones, a multifocal power transition zone may be formed between the zones. For example, as depicted in FIG. 1 a lens 10 may be provided having distance vision zone 11, near vision zone 13 and multifocal power transition zone 12 therebetween. More specifically, a multifocal power transition zone may be formed in a contact lens by selecting a width for each annular zone that is within about 0.5 to about 2, preferably about 0.5 to about 1.25 mm, of that of the directly adjacent zone or zones, while maintaining a radius of curvature difference between the zones of about 0.075 to about 0.75.

It is a further unexpected discovery of the invention that the multifocal power transition zone effect may be increased or decreased depending on the material selected for the lens. Preferably, the material selected for forming the lenses of the invention is a low modulus material. By "low modulus" is meant a modulus of about 20 to about 60, preferably about 20 to about 40 psi.

Suitable materials for forming contact lenses of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

In a preferred embodiment, the invention provides a lens comprising, consisting essentially of, and consisting of a low modulus material and at least two concentric, annular zones of alternating refractive power, each annular zone of a width and a radius of curvature suitable for forming a junction therebetween comprising, consisting essentially of, and consisting of a multifocal power transition zone.

The form of the transition zone in a power profile of the lens may take any of a variety of shapes including, without limitation, sinusoidal, triangular, elliptical, or the like. Preferably, the annular zone widths and radii, and the material forming the lens are selected so that the power profile of the lens assumes a sinusoidal or elliptical shape.

The power imparted by the multifocal transition zones may be further enhanced by selection of the number of annular zones used in the lens. For example, if a large number of zones are used, the power imparted by the transition zones will be greater than in a lens with a lesser number of zones. However, use of too great a number of zones may result in the lens imparting only intermediate refractive power. Thus preferably, for contact lenses, the number of zones used is about 4 to about 7, more preferably the lens has a central distance or near optical power zone surrounded by 3 zones of distance alternating with 3 zones of near optical power. The annular zones may be on either or both the concave or convex lens surface, but preferably are on the concave surface. The power increase or decrease on the transition zone will be about 0.5 to about 3 diopters.

In one embodiment, a pair of lenses is provided in which the central portion of the optic zone of each lens provides optical power substantially equal to the distance optical power. Annular zones of alternating distance and near optical power surround the central zone. Preferably, the rings and the central zone are on the same surface of the lens, more preferably both being on the concave lens surface. Alternatively, one lens may be as above-described, the other lens of the pair having a central zone with power substantially equal to the near optical power and surrounded with alternating near and distance optical power annular zones.

In a preferred embodiment, the invention provides the wearer with a pair of ophthalmic lenses, one lens to be worn in the non-dominant eye and one to be worn in the non-dominant eye. By "dominant eye" is meant the eye that predominates for distance vision. The lens worn by the dominant eye has a surface, preferably the convex surface, with a central optic zone with the desired distance optical power and a surface, preferably the concave surface, that has at least two concentric annular zones in its optic zone. The power of each of the at least two annular zones is substantially equal to that of the distance optical power. Either or both the convex and concave surfaces may have additional annular zones with distance optical power, near optical power, or combinations thereof Preferably, one surface, more preferably the convex surface, has only the central optical zone and no annular zones, the opposite surface, preferably the concave surface, in this embodiment having at least two annular zones of either or both distance and near optical power. More preferably, the convex surface has only a central optical zone having the distance optical power, the concave surface having at least two zones of the distance optical power and one or more annular zones of near optical power.

Further in this embodiment, the lens worn by the non-dominant eye has a surface, preferably the convex surface, with a central optic zone with substantially the desired near optical power. The opposite surface, preferably the concave surface, has at least two concentric annular zones in its optic zone. The power of each of the at least two annular zones is substantially equal to that of the near optical power. Either or both the convex and the concave surface have additional annular zones with distance optical power alternating with those having near optical power.

For the various contact lens embodiments, typically the lens will be constructed with one or both of a non-optical lenticular zone and peripheral zones. The ratio of the contact lenses' optic zone to be devoted to distance and near optical powers may be determined as disclosed in U.S. Pat. Nos. 5,835,192, 5,485,228, and 5,448,312, incorporated herein in their entireties by reference.

In all embodiments of the lenses of the invention, the distance and near optical powers may be aspherical or spherical powers, but preferably are spherical. The lenses may have any of a number of a variety of corrective optical characteristics incorporated onto the surfaces in addition to distance and near optical powers, such as, for example, cylinder power.

The lenses of the invention may be formed by any conventional method. For example, contact lenses with the annular zones formed therein may produced by diamond-turning using alternating radii. The zones may be diamond-turned into the molds that are used to form the lens of the invention. Subsequently, a suitable liquid resin is placed between the molds followed by compression and curing of the resin to form the lenses of the invention. Alternatively, the zones may be diamond-turned into lens buttons.

What is claimed is:

1. A contact lens comprising at least two concentric, annular zones of alternating distance and near optical power, each annular zone having a width that is within about 0.5 to about 2 mm of that of the directly adjacent annular zone or zones and a difference in radius of curvature of about 0.075 to about 0.75 mm from that of the directly adjacent annular zone or zones, wherein each of the junctions between the annular zones comprises a multifocal power zone.

2. The lens of claim 1, wherein the distance and near optical powers are spherical powers.

3. The lens of claim 1, wherein the annular zones are on the concave surface of the lens.

4. The lens of claim 1, wherein the annular zones comprise three distance optical power annular zones alternating with three near optical power annular zones.

5. The lens of claim 4, wherein the annular zones are on the concave surface of the lens.

6. The lens of claim 4, further comprising a central zone of distance or near optical power.

7. The lens of claim 6, wherein the central zone is on the convex surface of the lens and the annular zones are on the concave surface of the lens.

8. The lens of claim 4, wherein the distance and near optical powers are spherical powers.

9. A contact lens comprising a low modulus material and at least two concentric, annular zones of alternating distance and near optical power, each annular zone having a width that is within about 0.5 to about 2 mm of that of the directly adjacent annular zone or zones and a difference in radius of curvature of about 0.075 to about 0.75 mm from that of the directly adjacent annular zone or zones, wherein each of the junctions between the annular zones comprises a multifocal power zone.

10. The lens of claim 9, wherein the low modulus material is of a modulus of about 20 to about 40 psi.

11. The lens of claim 9, wherein the annular zones comprise three distance optical power annular zones alternating with the three near optical power annular zones.

12. The lens of claim 11, wherein the annular zones are on the concave surface of the lens.

13. The lens of claim 11, further comprising a central zone of distance or near optical power.

14. The lens of claim 13, wherein the central zone is on the convex surface of the lens and the annular zones are on the concave surface of the lens.

* * * * *